Oct. 23, 1956  H. H. GOLDSTAUB  2,768,360
THERMIONIC TUBE RETAINERS
Filed Aug. 4, 1953

United States Patent Office 2,768,360
Patented Oct. 23, 1956

---

2,768,360

THERMIONIC TUBE RETAINERS

Henry Herbert Goldstaub, Chigwell, England

Application August 4, 1953, Serial No. 372,291

Claims priority, application Great Britain August 6, 1952

2 Claims. (Cl. 339—75)

This invention relates to thermionic tube retainers.

According to the present invention there is provided a retainer for a thermionic tube comprising a first coil spring having at one end an uncoiled wire portion which extends laterally from the spring to constitute an arm, whilst the other end of said spring is adapted for anchorage, a second coil spring similar to the first, and means for joining the extremities of said arms, such means being intended to bear upon the tube for retaining the same.

Figure 2:
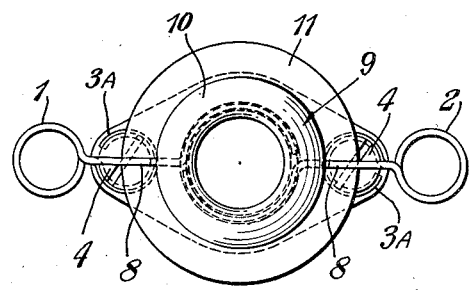
Figure 1:
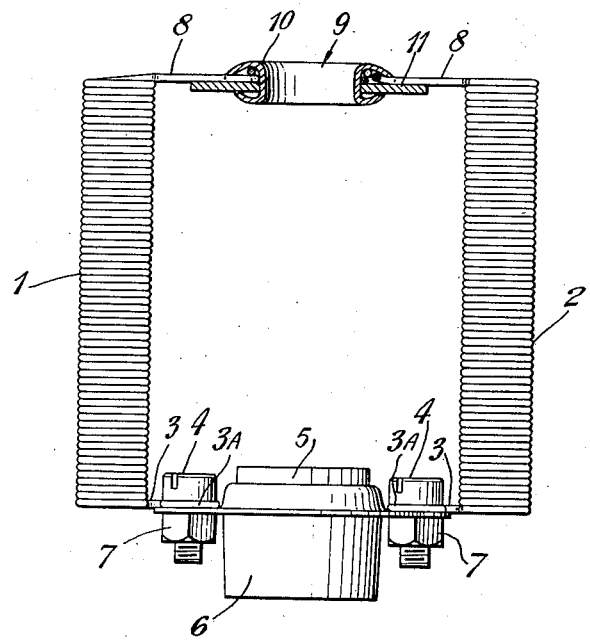

For a better understanding of the invention, and to show how the same may be carried into effect, reference will now be made to the accompanying drawings in which:

Figure 1 is a vertical section through a thermionic tube retainer attached to the socket for a tube, and Figure 2 is a plan view of Figure 1.

Referring now to the drawings, the themionic tube retainer includes coil springs 1 and 2. The lower end of each spring has a wire-portion 3 extending therefrom, the terminal part of which is bent round to be of circular shape. These terminal parts 3A are fitted under the heads of screws 4, which pass through holes in a ring 5 surrounding the socket 6 for a tube. The screws 4 are held in position by nuts 7 engaging against the under side of the ring 5.

The upper end of each spring 1 and 2 has a wire portion 8 extending laterally therefrom to constitute an arm. The extremities of the arms 8 are secured to the cap 9 of the tube retainer. The cap 9 is made from an eyelet 10 initially having a short skirt. The ends of the arms 8 are bent so that they fit round the skirt and thereafter a washer 11 is placed over the eyelet. The skirt is then expanded outwardly and pressed over the washer 11 to fix in position the arms 8.

The material of the tube retaining cap 9 may be metal or an insulating substance, depending upon the particular type of tube for which the tube retainer is to be employed.

In the above description reference has been made to a metallic ring 5 surrounding the socket 6. Such a ring 5 need not be employed and in practice the tube retainer may simply be held in position by locating the ends 3 of the springs 1 and 2 under screw heads anchoring the tube holder to the chassis. In certain cases it may be convenient to form holes near to the tube holder in the material constituting the chassis, the holes serving to receive screws or rivets under the heads of which the ends of the springs of the tube retainer are anchored.

I claim:

1. A retainer for a thermionic tube, comprising a first coiled spring, an anchorage portion at one end of the spring, an uncoiled arm part at the other end of the spring, the arm part extending laterally away from the spring in a plane normal to the axis of the spring, a loop-like portion lying in said plane and formed at the free end of the arm part, a second spring similar to the first spring and spaced therefrom in parallel relation, and an annular clamping means holding the two loop-like portions together in substantially co-planar overlapping relation, said annular clamping means including an eyelet, the wall of which forms an outwardly directed annular groove, the loop-like portions being clamped in the groove.

2. A retainer for a thermionic tube, comprising a first coiled spring, an anchorage portion at one end of the spring, an uncoiled arm part at the other end of the spring, the arm part extending laterally away from the spring in a plane normal to the axis of the spring, a loop-like portion lying in said plane and formed at the free end of the arm part, a second spring similar to the first spring and spaced therefrom in parallel relation, an annular clamping means holding the two loop-like portions together in substantially co-planar overlapping relation, said annular clamping means including an eyelet, the wall of which forms an outwardly directed annular groove, the loop-like portions being clamped in the groove, and a washer of greater outside diameter than the outside diameter of the eyelet secured by said eyelet parallel to the plane of said arms for the support thereof.

References Cited in the file of this patent

UNITED STATES PATENTS

| 1,348,970 | Thompson | Aug. 10, 1920 |
| 1,637,864 | Kolster | Aug. 2, 1927 |
| 2,449,646 | Emde | Sept. 21, 1948 |
| 2,512,424 | Goldstaub | June 20, 1950 |
| 2,539,581 | Holden | Jan. 30, 1951 |

FOREIGN PATENTS

| 783,623 | France | Apr. 8, 1935 |